Feb. 12, 1963 L. C. GUENON 3,077,230
EDGER ATTACHMENT
Filed Sept. 2, 1960
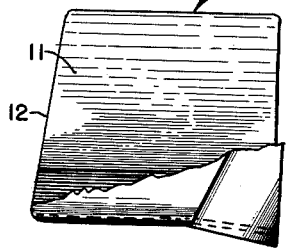
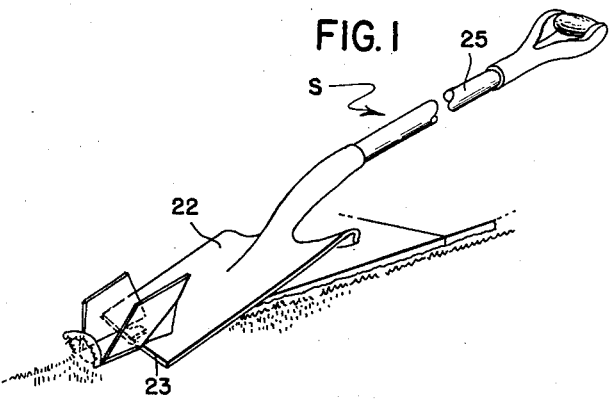
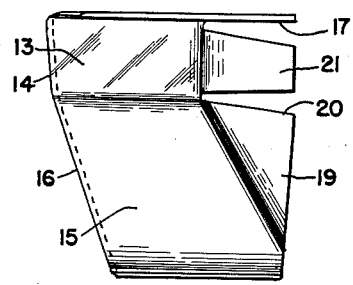
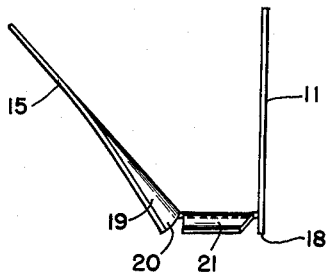
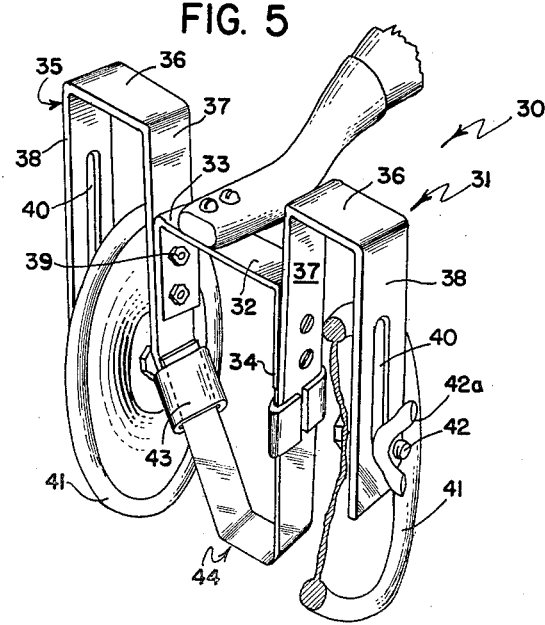
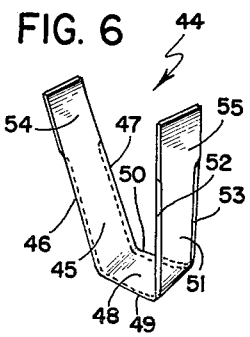
INVENTOR.
LEON C. GUENON
BY
*Williamson & Palmatier*
ATTORNEYS

United States Patent Office

3,077,230
Patented Feb. 12, 1963

3,077,230
EDGER ATTACHMENT
Leon C. Guenon, Minneapolis, Minn., assignor to
Merton R. Burris, Minneapolis, Minn.
Filed Sept. 2, 1960, Ser. No. 53,819
4 Claims. (Cl. 172—13)

This invention relates to edger devices for use in edging lawns and the like.

An object of this invention is to provide a novel lawn edger device, of simple and inexpensive construction, for use in edging lawns and the like.

Another object of this invention is to provide a novel and improved edger attachment for use in edging lawns and the like including a snap coupling means for permitting the edger attachment to be readily attached to a shovel scoop for quick detachment therefrom.

A more specific object of this invention is to provide a novel and improved lawn edger attachment comprising a channel-shaped cutting structure having cooperating gripping elements adjacent the rear portions thereof defining a snap coupling to enable the edger attachment to be quickly and rigidly attached to the leading straight edge portion of a handled shovel scoop in cooperating relation therewith for use in edging lawns and the like.

Another object of this invention is to provide a novel and improved edger apparatus for use in edging lawns and the like including wheeled frame and a guiding handle, and including a channel shaped cutting structure mounted on the frame for ready detachment therefrom to facilitate removal of the cutting structure for repair or replacement of the latter.

A still further object of this invention is to provide a novel edger apparatus for use in edging lawns and the like including a frame having revolving ground engaging means, the frame including socket means to enable a channeled shape cutting structure having sharpened leading and trailing edges to be quickly attached to the frame for ready removal therefrom and a guiding handle structure for use in facilitating guiding of the apparatus during the use thereof.

These and other objects and advantages of my invention will more fully appear from the following description made in connection with the accompanying drawing wherein like character references refer to the same or similar parts throughout the several views, and in which:

FIG. 1 is a front perspective view of one embodiment of my invention, shown attached to a conventional shovel;

FIG. 2 is a side elevational view on an enlarged scale of the embodiment of my invention shown in FIG. 1 with certain parts thereof broken away for clarity;

FIG. 3 is a top plan view on the same scale as FIG. 2 and illustrating the embodiment therein;

FIG. 4 is a rear elevational view on the same scale and showing the embodiment illustrated in FIG. 2;

FIG. 5 is a front perspective view of a different embodiment of my invention with certain parts thereof broken away for clarity; and FIG. 6 is a front perspective view of the channel shape cutting structure of the embodiment shown in FIG. 5.

Referring now to FIGS. 1 to 4, it will be seen that one embodiment of my invention includes an edger attachment designated in its entirety by the reference numeral 10 and illustrated in FIG. 1 in cooperative attached relation to a shovel S. My novel edger attachment 10 is preferably formed from a single blank of tempered steel preferably having some measure of resiliency. This edger attachment, as best seen in FIG. 2, includes a first upright, substantially flat blade 11 having a forwardly and downwardly inclined leading cutting edge 12. The lower terminal portions of the first upright blade 11 are integrally formed with a transversely extending blade 13 also having a sharpened leading cutting edge 14. It should be pointed out that the blank of metallic steel from which the edger attachment is formed is preferably of relatively thin gauge steel, tempered, as pointed out above, to provide sufficient toughness and resiliency to withstand stresses encountered when the edger is pushed through the soil during the edging operation.

The edger attachment 10 also includes a second upright blade integrally formed with the transversely extending blade 13 and extending obliquely upwardly and outwardly therefrom. This second upright blade 15 is also provided with an inclined, sharpened leading cutting edge 16 and it will be noted that the second upright blade 15 is disposed in angulated relation with respect to the first upright blade 11. Upright blades 11 and 15 cooperate with the transversely extending blade 13 to define therewith a substantially channel shaped cutting structure as best seen in FIG. 4, it being noted that blade 11 is disposed substantially normal to the generally plane of the transversely extending blade 13.

Referring now to FIGS. 3 and 4 it will be seen that the first blade 11 is provided with a rearwardly extending extension 17 which extends beyond the rearmost portion of the transversely extending blade 13 and this extension 17 is provided with a free lower edge 18. It will also be noted that the second upright blade 15 is also provided with a rearwardly projecting extension 19 and also extending beyond the rearmost portion of transversely extending blade 13 and also having a free lower edge 20. The transversely extending blade 13 is provided with a resilient gripping member 21 extending rearwardly and inclined slightly downwardly therefrom. Actually, this resilient gripping member 21 is integrally formed with the transversely extending blade 13 and it will be noted that the lower free edges 18 and 20 of the extensions 17 and 19, respectively, extend downwardly beyond the general plane of this relatively flat gripping member 21 and cooperate therewith to define snap coupling means to permit the edger attachment to be gripped or coupled to a shovel scoop.

In this connection it will be noted that my edger attachment as shown in FIG. 1 is adapted for use with a shovel S and cooperates therewith for the formation of a trench and the removal of the cut sod and grass resulting from this trenching operation. The shovel S is provided with a conventional shovel scoop 22 preferably having a substantially straight leading edge 23 and having an elongate handle 25. When the edger attachment 10 is secured to the leading edge portion 23 of the shovel scoop 22, the lower free edges 18 and 20 of the upright blade extensions 17 and 19, respectively, are positioned upon the upper surface of the shovel scoop while the resilient gripping member 21 is urged downwardly below the lower surface of the shovel scoop 22. It will, therefore, be seen that the shovel scoop will be gripped between the gripping member 21 and the lower free edges 18 and 20 so that the edger attachment is securely coupled to the shovel scoop but which is so connected to the shovel scoop to permit the edger attachment to be readily removed therefrom by merely pulling the attachment from the shovel scoop. When so connected, the edger attachment 10 projects forwardly from the shovel and is disposed at the correct angulated relation to permit the attachment to be pushed through the soil to form an edging trench adjacent a wall or walk or the like. During this operation, the cut soil or sod removed in the formation of the trench will be caused to move upwardly upon the shovel scoop to actually facilitate removal of the sod. During the removal or trenching process, it will be noted that the extension 19 of the second blade 15 actually flares or curves laterally outwardly and defines a guiding surface for aiding in the guiding of the cut sod and grass upon the shovel scoop.

It is pointed out that my novel edger attachment could be attached to other implements but that it is especially adaptable for use with straight edge shovel scoops because of the close cooperative relation of the edger and the scoop during the trenching operation. It will be noted that this edger attachment is constructed from a single blank of metallic material and may be readily removed for storage when not used to permit the shovel to be used for other purposes which is a marked distinction from the conventional edger apparatus which are both expensive and complex in both operation and structure.

Referring now to FIGS. 5 and 6, it will be seen that I have provided as another embodiment of my invention an edger device generally designated by the reference numeral 30. This edger device 30 is provided with a supporting frame 31 including a centrally-located inverted U-shaped member or bracket 32 which includes a web or a bight portion 33 and depending legs 34. Frame 31 also includes a pair of outer inverted U-shaped members 35 of substantially identical construction and each secured to one of the legs 34 of the U-shaped member 32. Each of these outer U-shaped members 35 includes a web or bight portion 36 and a depending inner leg 37 and depending outer leg 38. The innermost of the legs 37 and each of the U-shaped members 35 is secured to its associated leg 34 of the U-shaped member 32 by means of bolts 39, as best seen in FIG. 5.

It will be seen that the outer leg 38 of each of the U-shaped members 35 is provided with an elongate vertically extending slot 40 and each of these outer legs 38 has a ground engaging wheel 41 rotatably secured thereto. Actually the wheels 41 are provided with a bolt 41 which extends through the slot 40 and is vertically movable therein, the bolt 42 being secured in adjusted position by means of a wing nut 42a. With this arrangement, the ground engaging wheels may be adjusted vertically relative to the frame 31 to vary the depth of the cut of the edging device 30 in a manner to be described hereinbelow.

It will be seen that the lower terminal portions of the inner legs 37 of each U-shaped member 35 is provided with a socket defining member 43 which is secured to its associated inner leg 37 as by welding or the like and defines therewith a socket. However, the edger device 30 is also provided with a channel-shaped cutting structure 44 of integral construction and including a first upright substantially flat blade 45 having a leading cutting edge 46 and a trailing sharpened cutting edge 47, as best seen in FIG. 6.

This channel-shaped cutting structure 44 also includes a transversely extending blade 48 integrally formed with the lower terminal portion of the first upright blade 45 and extending horizontally therefrom and being provided with a sharpened leading cutting edge 49 and sharpened trailing cutting edge 50. A second upright substantially flat blade 51 extends obliquely upwardly and outwardly from the transversely extending blades 48 and is provided with a sharpened leading edge 52 and a sharpened trailing cutting edge 53. It will be noted that the channel-shaped cutting structure 44 is shaped similarly to the edger attachment 10 of the embodiments shown in FIGS. 1 to 4 but is additionally provided with leading and trailing cutting edges to permit the device to be pulled as well as pushed during the cutting operation.

The upper terminal portions of the upright blades 45 and 51 are provided with socket-engaging portions 54 and 55 respectively. These socket engaging portions are adapted to be positioned within the sockets defined by the socket defining members 43 and the lower terminal portions of the inner legs 37. In this connection, it will be seen that the channel shaped cutting structure when secured to the frame 31 is positioned between the ground engaging wheels 41 and may be quickly removed from the sockets by merely pulling the socket-engaging portions from their frictionally engaged relationship with the socket defining members 43.

In operation, the edging device 30 may be either pushed or pulled along a wall or walk and the channel shaped cutting structure 44 will form a trench, the depth of which may be varied by vertically adjusting the ground-engaging wheels 41. In the event the channel-shaped cutting structure becomes dull through use or becomes damaged the cutting structure may be quickly removed for repair or replacement by merely pulling the device downwardly from its seated relation with the socket engaging members. The relatively narrow width of the blades of the cutting structure 44 permits the edger device to be easily moved through the soil for forming the trench and, of course, the device may be either pushed or pulled because of the double sharpened edge feature of each of the blades.

It will, therefore, be seen that I have provided a novel lawn edging device including a channel-shaped cutting structure integrally formed from a single blank of metallic material. It will be seen that I have provided a novel edger attachment readily connectible and disconnectible from a conventional shovel scoop to thereby render the attachment of relatively inexpensive construction.

It will also be seen from the foregoing description that while my edger device is of simple and inexpensive construction, the device is arranged and constructed to function in a highly efficient manner in edging lawns and the like.

It will, of course, be understood that various changes may be made in the form, details, arrangement and proportions of the various parts without departing from the scope of my invention.

What I claim is:

1. An edger attachment for use in edging lawns and the like and being readily attachable to a handled shovel of the type having a scoop with a substantially straight leading edge, said edger attachment including a first substantially flat upright blade having a sharpened leading cutting edge, a second substantially flat upright blade spaced from said first blade and being disposed in angulated relation with the latter and having a sharpened leading cutting edge, a transversely extending blade having a sharpened leading edge and extending between and rigidly connected to the lower terminal portions of said upright blades and defining therewith a channel-shaped cutting structure, said upright blades having extensions projecting rearwardly beyond the rearmost portion of said transversely extending blade and each of said extensions having a free lower edge, and a resilient clamping member connected to said transversely extending blade and extending rearwardly therefrom and cooperating with the lower free edges of said upright blade extensions to define a snap coupling therewith for frictionally gripping the straight leading edge portion of a handle shovel scoop disposed therebetween, whereby said edger attachment may be attached to such a handled shovel scoop for ready detachment therefrom.

2. The structure as defined in claim 1 wherein said resilient member is integrally formed with said transversely extending blade and is of substantially flat configuration and wherein the lower free edges of said upright blade extension are disposed below the general plane of said resilient gripping member.

3. The structure as defined in claim 1 wherein said sharpened leading edges of said upright blades are inclined downwardly and forwardly.

4. The structure as defined in claim 1 wherein said rearward extension of said second upright blade is flared outwardly from the general plane of said last mentioned upright blade.

References Cited in the file of this patent

UNITED STATES PATENTS

| | | |
|---|---|---|
| 851,840 | Sawyer | Apr. 30, 1907 |
| 897,838 | Logue | Sept. 1, 1908 |
| 1,101,713 | Putnam | June 30, 1914 |
| 1,107,583 | Burchell | Aug. 18, 1914 |
| 1,400,627 | Rosel | Dec. 20, 1921 |
| 1,487,713 | Bucher | Mar. 25, 1924 |
| 1,712,135 | Cipko | May 7, 1929 |
| 1,785,531 | Roesch et al. | Dec. 16, 1930 |

FOREIGN PATENTS

| | | |
|---|---|---|
| 110,527 | Australia | May 16, 1940 |
| 147,295 | Sweden | Oct. 12, 1954 |